UNITED STATES PATENT OFFICE.

HUGO SCHWEITZER, OF ELBERFELD, AND ARTHUR ZART, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

MONOAZO DYE.

1,009,796. Specification of Letters Patent. Patented Nov. 28, 1911.

No Drawing. Application filed August 1, 1911. Serial No. 641,773.

*To all whom it may concern:*

Be it known that we, HUGO SCHWEITZER and ARTHUR ZART, doctors of philosophy, chemists, citizens of the German Empire, residing, respectively, at Elberfeld and Vohwinkel, near Elberfeld, Germany, have invented new and useful Improvements in New Monoazo Dye, of which the following is a specification.

The present invention relates to the manufacture and production of new azo coloring matters having most probably the formula:

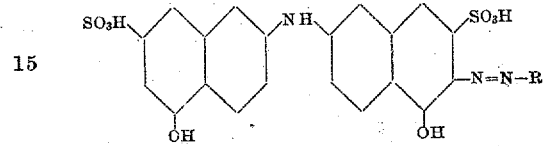

R meaning a naphthol sulfonic acid, such as 5-naphthol-7-sulfonic acid or 6-naphthol-3-sulfonic acid.

The new dyes are obtained by combining the diazo compounds prepared from an aminonaphthol sulfonic acid e. g. 2.5.7-, 1.5.7- or 1.6.3-aminonaphthol sulfonic acid with the 5.5'-dioxy-2.2'-dinaphthylamin-7.7'-disulfonic acid:

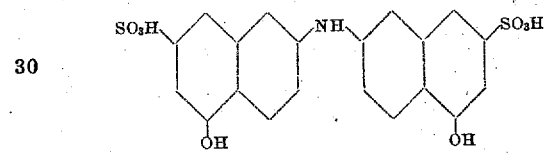

The new dyes having most probably the formula:

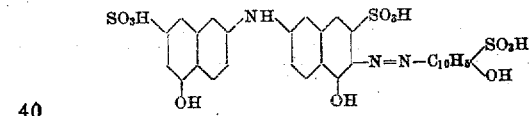

are after being dried and pulverized in the shape of their alkaline salts dark powders soluble in water; yielding upon reduction with stannous chlorid and hydrochloric acid an aminonaphthol sulfonic acid and a compound of the formula:

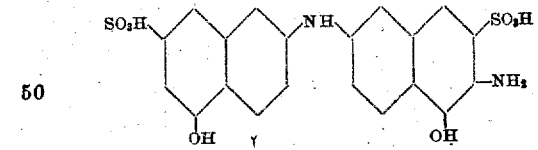

dyeing cotton from reddish-violet to bluish-violet shades which on being developed with diazotized para-nitranilin change into shades fast to washing and capable of being discharged to a pure white.

The following example may further illustrate the invention, the parts being by weight:—239 parts (1 mol.) of 2-amino-5-naphthol-7-sulfonic acid are diazotized with 70 parts of sodium nitrite and hydrochloric acid and combined with 461 parts of the 5.5'-dioxy-2.2'-dinaphthylamin-7.7'-disulfonic acid containing an excess of sodium bicarbonate. The mixture is heated and the dye is salted out with common salt, filtered off and dried.

The new dye having most probably the formula:

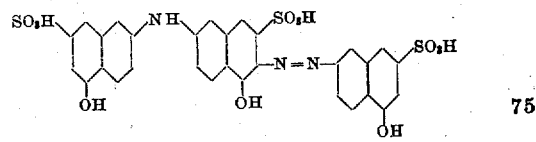

is in the shape of its sodium salt a dark powder which is easily soluble in water with a reddish-violet coloration and which is soluble in concentrated sulfuric acid with a violet coloration. Upon reduction with stannous chlorid and hydrochloric acid it is split up into 6-amino-5.5'-dioxy-2.2'-dinaphthylamin-7.7'-disulfonic acid and 2.5.7-aminonaphthol sulfonic acid. It dyes cotton reddish-violet. The shade after being developed with diazotized para-nitranilin is bluish-violet fast to washing. It can be discharged to a pure white.

We claim:—

1. The herein described new monoazo dyestuffs having most probably the formula:

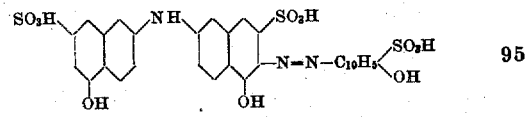

which are after being dried and pulverized in the shape of their alkaline salts dark powders soluble in water; yielding upon reduction with stannous chlorid and hydrochloric acid an aminonaphthol sulfonic acid and a compound of the formula:

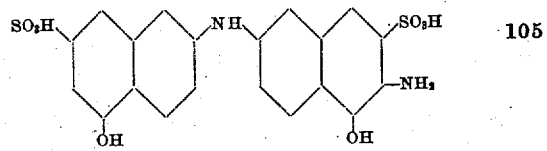

dyeing cotton from reddish-violet to bluish-violet shades which on being developed with diazotized para-nitranilin change into shades fast to washing and capable of being discharged to a pure white, substantially as described.

2. The herein described new dye having most probably the formula:

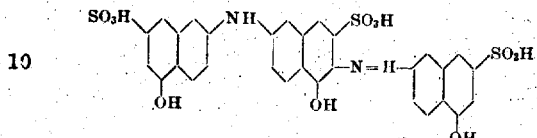

which is after being dried and pulverized in the shape of its sodium salt a dark powder soluble in concentrated sulfuric acid with a violet coloration; yielding upon reduction with stannous chlorid and hydrochloric acid 2.5.7-aminonaphthol sulfonic acid and 6-amino-5.5'-dioxy-2.2'-dinaphthylamin-7.7'-disulfonic acid; dyeing cotton reddish-violet, which shade after being developed with diazotized para-nitranilin is bluish-violet fast to washing which can be discharged to a pure white, substantially as described.

In testimony whereof we have hereunto set our hands in the presence of two subscribing witnesses.

HUGO SCHWEITZER. [L. S.]
ARTHUR ZART. [L. S.]

Witnesses:
CHAS. J. WRIGHT,
ALBERT F. NUTER.

---

It is hereby certified that in Letters Patent No. 1,009,796, granted November 28, 1911, upon the application of Hugo Schweitzer, of Elberfeld, and Arthur Zart, of Vohwinkel, near Elberfeld, Germany, for an improvement in "Monoazo Dye," an error appears in the printed specification requiring correction as follows: Page 2, line 10, formula, for the symbol "N=H" read $N=N$; and that the said Letters Patent should be read with this correction therein that the same may conform to the record of the case in the Patent Office.

Signed and sealed this 6th day of February, A. D., 1912.

[SEAL.]

C. C. BILLINGS,
*Acting Commissioner of Patents.* violet shades which on being developed with diazotized para-nitranilin change into shades fast to washing and capable of being discharged to a pure white, substantially as described.

2. The herein described new dye having most probably the formula:

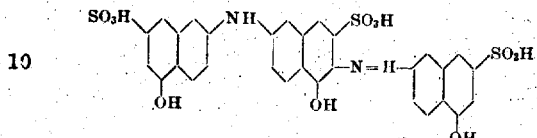

which is after being dried and pulverized in the shape of its sodium salt a dark powder soluble in concentrated sulfuric acid with a violet coloration; yielding upon reduction with stannous chlorid and hydrochloric acid 2.5.7-aminonaphthol sulfonic acid and 6-amino-5.5'-dioxy-2.2'-dinaphthylamin-7.7'-disulfonic acid; dyeing cotton reddish-violet, which shade after being developed with diazotized para-nitranilin is bluish-violet fast to washing which can be discharged to a pure white, substantially as described.

In testimony whereof we have hereunto set our hands in the presence of two subscribing witnesses.

HUGO SCHWEITZER. [L. S.]
ARTHUR ZART. [L. S.]

Witnesses:
 CHAS. J. WRIGHT,
 ALBERT F. NUTTER.

---

Correction in Letters Patent No. 1,009,796.

It is hereby certified that in Letters Patent No. 1,009,796, granted November 28, 1911, upon the application of Hugo Schweitzer, of Elberfeld, and Arthur Zart, of Vohwinkel, near Elberfeld, Germany, for an improvement in "Monoazo Dye," an error appears in the printed specification requiring correction as follows: Page 2, line 10, formula, for the symbol "N=H" read $N=N$; and that the said Letters Patent should be read with this correction therein that the same may conform to the record of the case in the Patent Office.

Signed and sealed this 6th day of February, A. D., 1912.

[SEAL.]

C. C. BILLINGS,
*Acting Commissioner of Patents.*

Correction in Letters Patent No. 1,009,796.

It is hereby certified that in Letters Patent No. 1,009,796, granted November 28, 1911, upon the application of Hugo Schweitzer, of Elberfeld, and Arthur Zart, of Vohwinkel, near Elberfeld, Germany, for an improvement in "Monoazo Dye," an error appears in the printed specification requiring correction as follows: Page 2, line 10, formula, for the symbol "N=H" read $N=N$; and that the said Letters Patent should be read with this correction therein that the same may conform to the record of the case in the Patent Office.

Signed and sealed this 6th day of February, A. D., 1912.

[SEAL.]

C. C. BILLINGS,
*Acting Commissioner of Patents.*